United States Patent
Iwanaga

(10) Patent No.: US 10,816,886 B2
(45) Date of Patent: Oct. 27, 2020

(54) LIGHT SOURCE UNIT AND PROJECTOR

(71) Applicant: CASIO COMPUTER CO., LTD., Tokyo (JP)

(72) Inventor: Masakuni Iwanaga, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/561,902

(22) Filed: Sep. 5, 2019

(65) Prior Publication Data

US 2020/0103735 A1 Apr. 2, 2020

(30) Foreign Application Priority Data

Oct. 1, 2018 (JP) .................................. 2018-186677

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/2066* (2013.01); *G03B 21/2073* (2013.01)

(58) Field of Classification Search
CPC .............. G03B 21/204; G03B 21/2066; G03B 21/2073; G03B 26/008
USPC ......................................................... 362/19
See application file for complete search history.

(56) References Cited

U.S. PATENT DOCUMENTS

| | | | | |
|---|---|---|---|---|
| 2009/0187234 A1* | 7/2009 | Meyer | ....................... | F21V 9/45 607/88 |
| 2010/0283977 A1* | 11/2010 | Wang | ................... | G03B 21/204 353/84 |
| 2011/0116253 A1* | 5/2011 | Sugiyama | ............... | F21S 10/02 362/84 |
| 2011/0149549 A1* | 6/2011 | Miyake | ..................... | F21K 9/64 362/84 |
| 2012/0075591 A1* | 3/2012 | Ogura | .................. | G03B 21/204 353/31 |
| 2014/0078472 A1* | 3/2014 | Masuda | ............... | G03B 21/204 353/31 |
| 2014/0078476 A1* | 3/2014 | Masuda | ............... | G03B 21/142 353/85 |

(Continued)

FOREIGN PATENT DOCUMENTS

JP 2012-212129 A 11/2012

*Primary Examiner* — Bryon T Gyllstrom
(74) *Attorney, Agent, or Firm* — Fitch, Even, Tabin & Flannery LLP

(57) ABSTRACT

A light source unit includes a blue light source configured to output light in a blue wavelength range, an excitation light source configured to emit excitation light having a shorter wavelength than a wavelength of the light in the blue wavelength range outputted from the blue light source, and a luminescent wheel including a luminescent light emitting area on to which the excitation light is shined to thereby emit luminescent light and a light guiding area configured to transmit or reflect the light in the blue wavelength range, and the excitation light is shined on to the luminescent light emitting area from a first surface side of the luminescent wheel, and the light in the blue wavelength range is shined on to the light guiding area from a second surface side of the luminescent wheel that is opposite to the first surface side.

20 Claims, 8 Drawing Sheets

(56) References Cited

U.S. PATENT DOCUMENTS

| | | | |
|---|---|---|---|
| 2015/0062908 A1* | 3/2015 | Choi | G03B 33/08 |
| | | | 362/293 |
| 2015/0085262 A1* | 3/2015 | Ogura | G03B 21/204 |
| | | | 353/85 |
| 2016/0165194 A1* | 6/2016 | Hartwig | H04N 9/3111 |
| | | | 353/31 |
| 2016/0241820 A1* | 8/2016 | Umamine | G03B 21/204 |
| 2016/0360166 A1* | 12/2016 | Ogawa | G03B 21/204 |
| 2020/0064720 A1* | 2/2020 | Umamine | G03B 21/2066 |

* cited by examiner

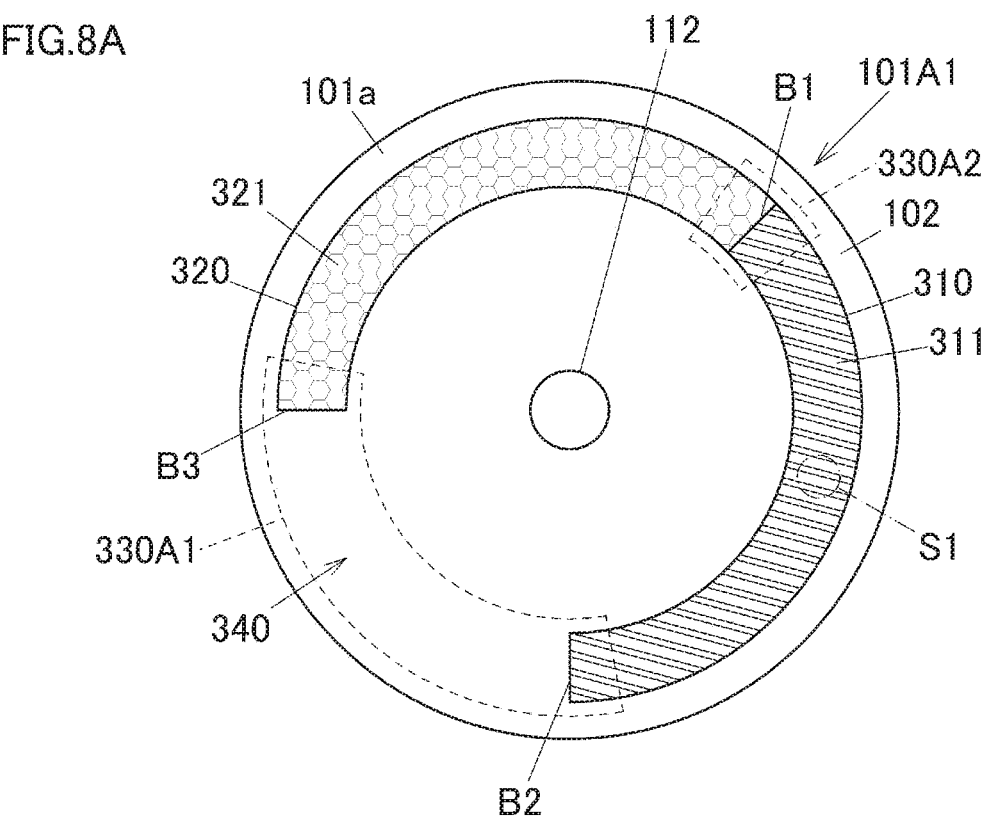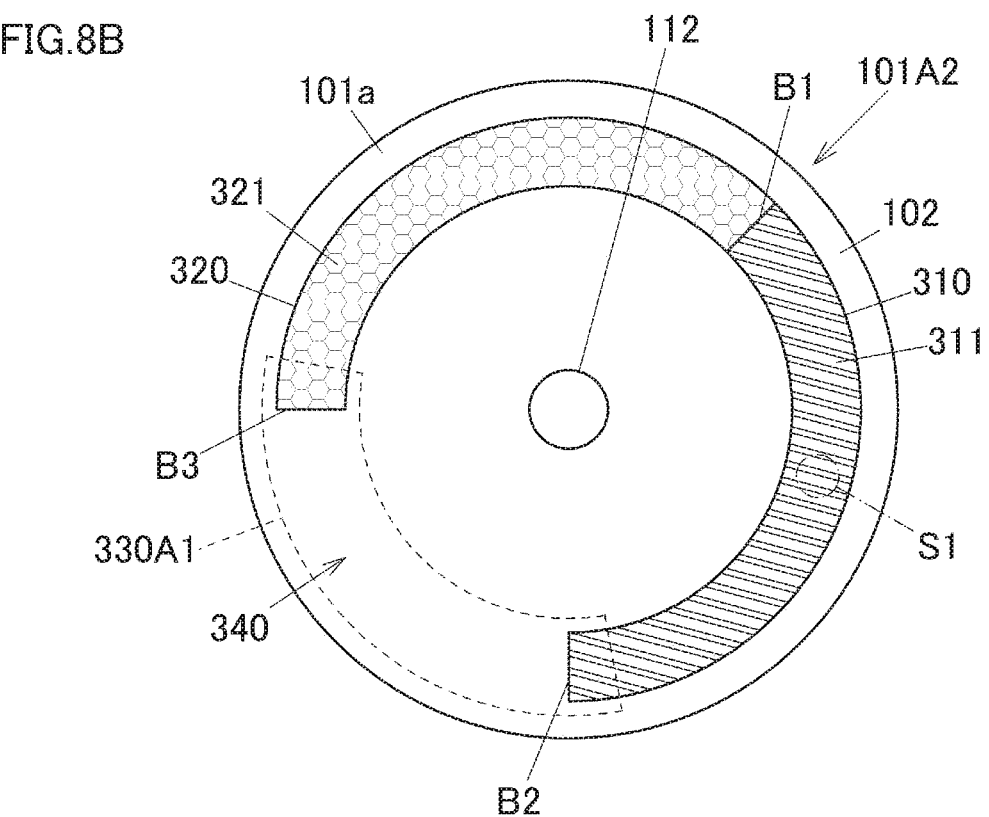

LIGHT SOURCE UNIT AND PROJECTOR

CROSS-REFERENCE TO RELATED APPLICATION

This patent application is based upon and claims the benefit of Japanese Patent Application No. 2018-186677 filed on Oct. 1, 2018, the entire disclosure of which is incorporated by reference herein.

BACKGROUND OF THE INVENTION

Field of the Invention

The present invention relates to a light source unit and a projector including the light source unit.

Description of the Related Art

In these days, data projectors are widely used on many occasions as a projector for projecting a screen of a personal computer, a video image, and further, an image based on image data recorded on a memory card or the like onto a screen. In these data projectors, light emitted from a light source is collected onto a micromirror display device called a digital micromirror device (DMD) or a liquid crystal panel so as to display a color image onto a screen.

For example, Japanese Patent Laid-Open No. 2012-212129 (JP-A-2012-212129) discloses a light source unit that includes an excitation light source for emitting excitation light, a first wheel provided with a luminescent material layer configured to emit luminescent light by being excited by excitation light that is shined on to the luminescent material layer, and a polarization dichroic mirror provided between the first wheel and the excitation light source. A quarter wave plate is provided between the first wheel and the dichroic mirror. Luminescent light emitted from the first wheel is reflected by the polarization dichroic mirror and is then guided to a rod integrator. In emitting excitation light as light source light, excitation light passes through the quarter wave plate twice, and is reflected by the polarization dichroic mirror, and is guided to the rod integrator.

However, in the first wheel described in JP-A-2012-212129, it is considered that part of the excitation light that is shined on to the luminescent material layer is not converted into luminescent light but is reflected towards the polarization dichroic mirror. The excitation light reflected by the first wheel passes through the quarter wave plate and is then reflected towards the rod integrator by the polarization dichroic mirror. Consequently, in the configuration of JP-A-2012-212129, a color wheel (a second wheel) is disposed so as to prevent light having a wavelength in the blue wavelength range, or simply, light in the blue wavelength range used as the excitation light from mixing into the luminescent light guided to the rod integrator, whereby the color purity is prevented from being deteriorated. Due to this, the space utilization efficiency in the casing and the luminous efficiency of the projector are not good.

SUMMARY OF THE INVENTION

The present invention has been made in view of the situations described above, and an object of the present invention is to provide a light source unit in which color purity is improved with good efficiency and a projector including the light source unit.

According to an aspect of the present invention, there is provided a light source unit including: a blue light source configured to output light in a blue wavelength range; an excitation light source configured to emit excitation light having a shorter wavelength than a wavelength of the light in the blue wavelength range outputted from the blue light source; and a luminescent wheel including a luminescent light emitting area on to which the excitation light is shined to thereby emit luminescent light and a light guiding area configured to transmit or reflect the light in the blue wavelength range, and in this light source unit, the excitation light is shined on to the luminescent light emitting area from a first surface side of the luminescent wheel, and the light in the blue wavelength range is shined on to the light guiding area from a second surface side of the luminescent wheel that is opposite to the first surface side.

According to another aspect of the present invention, there is provided a projector including: the light source unit described above; a display device on to which light source light from the light source unit is shined to form image light; a projection optical system configured to project the image light emitted from the display device on to a screen; and a control unit configured to control the display device and the light source unit.

BRIEF DESCRIPTION OF THE DRAWINGS

FIG. 8A is a schematic diagram of a luminescent wheel according to a modified example of the second embodiment of the present invention, illustrating the luminescent wheel of a first modified example; and FIG. 8B is a schematic diagram of a luminescent wheel according to another modified example of the second embodiment of the present invention, illustrating the luminescent wheel according to a second modified example.

DETAILED DESCRIPTION OF THE PREFERRED EMBODIMENTS

First Embodiment

Figure 1:
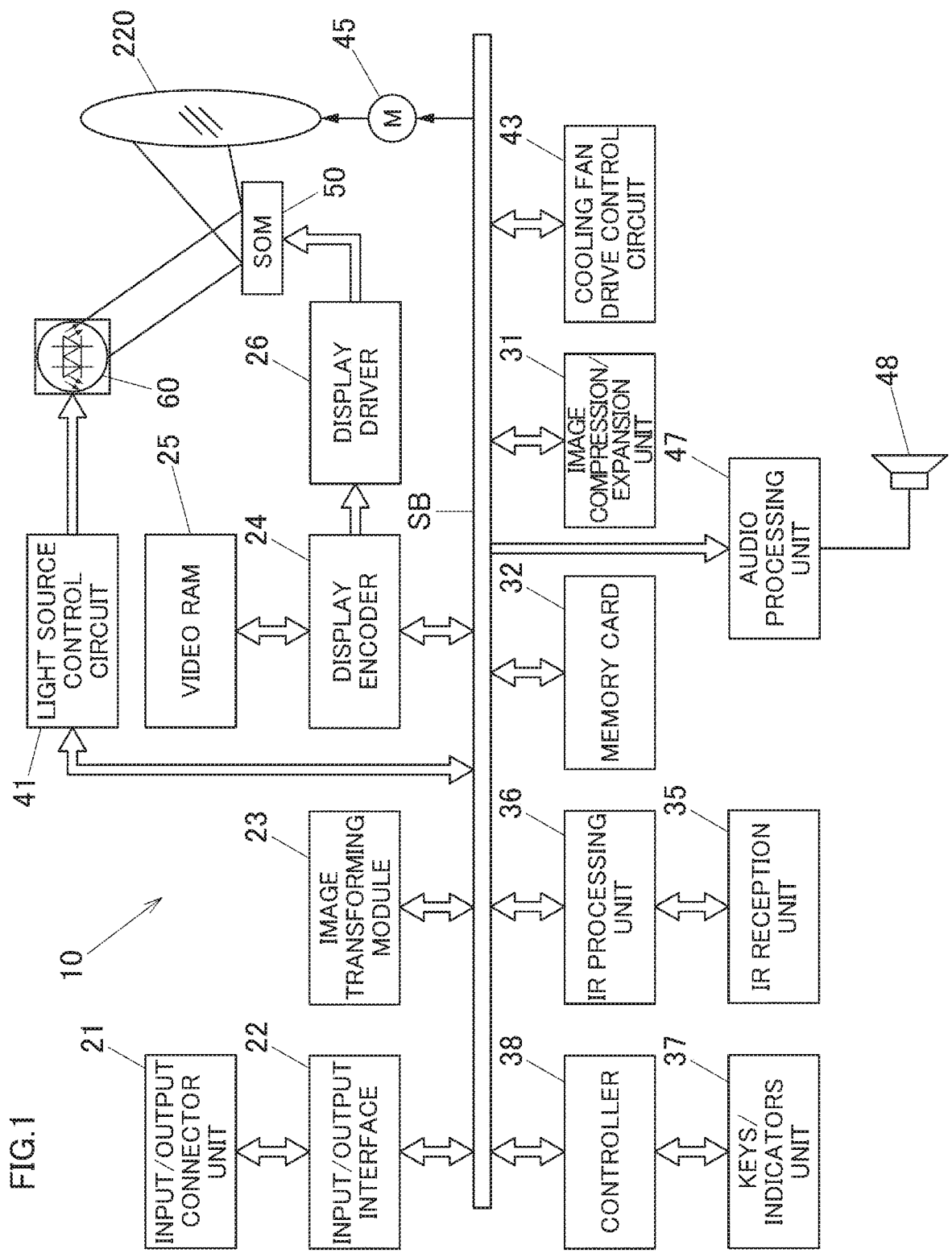
FIG. 1 is a block diagram illustrating functional circuit blocks of a projector according to a first embodiment of the present invention.

Hereinafter, a first embodiment of the present invention will be described. FIG. 1 is a block diagram illustrating functional circuit blocks of a projector 10. A projector control unit includes a CPU including an image transforming module 23 and a controller 38, and a front-end unit including an input/output interface 22, and a formatter unit including a display encoder 24 and a display driver 26. Image signals of various standards which are inputted from an input/output connector unit 21 are sent, via the input/output interface 22 and a system bus (SB), to the image transforming module 23, where the image signals are transformed so as to be unified into an image signal of a predetermined format which is suitable for display. Thereafter, the unified image signal to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 drives a display device 51, which is a spatial optical modulator (SOM), at an appropriate frame rate according to the image signal outputted from the display encoder 24. Then, in the projector 10, a pencil of light emitted from a light source unit 60 is shined on to the display device 51 by way of a light guiding optical system to thereby form an optical image by light reflected from the display device 51, and the image so formed is then projected onto a screen, not illustrated, for display by way of a projection optical system 220. A movable lens group of the projection optical system 220 is driven by a lens motor 45 for zooming and focusing.

An image compression/expansion unit 31 performs a recording process in which a luminance signal and a color difference signal of an image signal are data compressed through processing of Adaptive Discrete Cosine Transform (ADCT) and Huffman coding, and the compressed data is sequentially written on a memory card 32, which constitutes a detachable recording medium. Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

The controller 38 governs the control of operations of individual circuitries inside the projector 10 and includes CPU, ROM storing fixedly operation programs such as various settings, RAM that is used as a work memory, and the like.

Operation signals from a keys/indicators unit 37 including main keys and indicators which are provided on an upper panel of a casing of the projector 10 are sent out directly to the controller 38. Key operation signals from a remote controller are received by an IR reception unit 35 and are then demodulated into a code signal at an Ir processing unit 36 for output to the controller 38.

The controller 38 is connected with an audio processing unit 47 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41, which functions as a light source control unit. The light source control circuit 41 can control operations of the light source unit 60 including an excitation light shining device 70 and a blue light source device 90 (refer to FIG. 2) so that light beams in predetermined wavelength ranges required for forming an image are emitted from the light source unit 60.

Further, the controller 38 causes a cooling fan drive control circuit 43 to detect temperatures with a plurality of temperature sensors which are provided in the light source unit 60 so as to control revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors.

Figure 2:
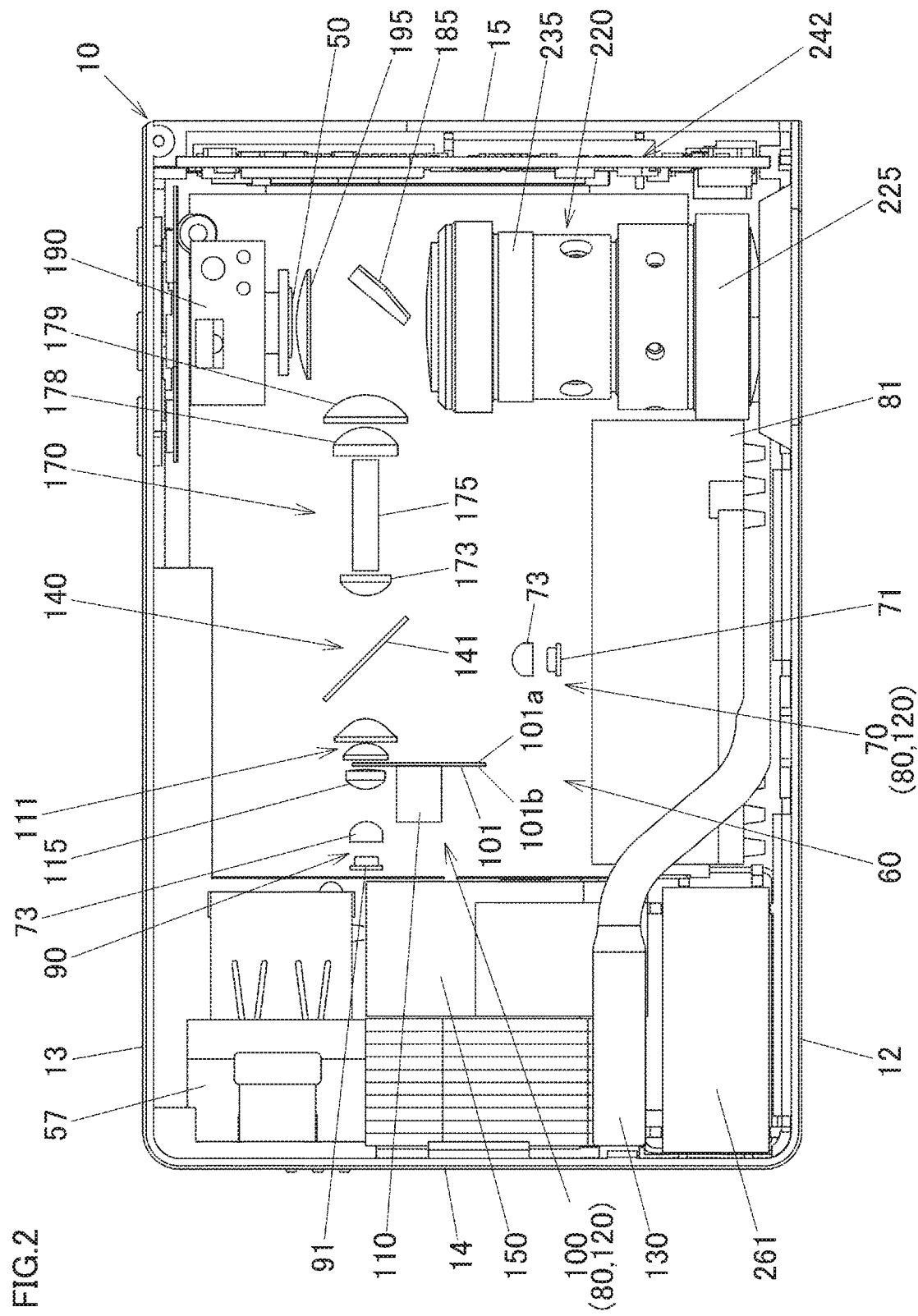
FIG. 2 is a schematic plan view illustrating an internal structure of the projector according to the first embodiment of the present invention.

FIG. 2 is a schematic plan view illustrating an internal structure of the projector 10. It should be noted that in the following description, when left and right are referred to in relation to the projector 10, they denote, respectively, left and right directions with reference to a projecting direction of the projector 10. When front and rear are referred to in relation to the projector 10, they denote, respectively, front and rear directions with reference to a direction from the projector 10 towards a screen and a traveling direction of a pencil of light from the projector 10.

The projector 10 includes a control circuit board 242. This control circuit board 242 includes a power supply circuit block, a light source control block, and the like. The projector 10 also includes the light source unit 60 at a substantially central portion of the casing of the projector 10. Further, in the projector 10, a complex optical system. 170 and the projection optical system. 220 are disposed between the light source unit 60 and a left panel 15

The light source unit 60 includes the excitation light shining device 70, which constitutes a light source of excitation light, a red light source device 120, which constitutes a light source of light of a wavelength in the red wavelength range or, simply, light in the red wavelength range, a green light source device 80, which constitutes of a light source of light of a wavelength in the green wavelength range or, simply, light in the green wavelength range, the blue light source device 90, which constitutes a light source of light of a wavelength in the blue wavelength range, or simply, light in the blue wavelength range, and a light guiding optical system 140. The light guiding optical system 140 guides excitation light, light in the red wavelength range, light in the green wavelength range, and light in the blue wavelength range, and in these colors of light, light in the red wavelength range, light in the green wavelength range, and light in the blue wavelength range are guided towards the complex optical system 170 as excitation light.

The excitation light shining device 70 is disposed to a first surface 101a of a luminescent wheel 101 in the casing of the projector 10. The excitation light shining device 70 includes an ultraviolet laser diode 71, constituting the light source of excitation light, which is disposed in such a manner that an optical axis thereof becomes parallel to a right panel 14 and the left panel 15, a collimator lens 73, a heat sink 81 disposed between the ultraviolet laser diode 71 and a front panel 12, and the like.

The ultraviolet laser diode 71 emits light of a wavelength in the ultraviolet wavelength range, or simply, light in the ultraviolet wavelength range (a so-called ultraviolet ray). The collimator lens 73 is disposed on an optical axis of the ultraviolet laser diode 71 and converts light emitted from the ultraviolet laser diode 71 into parallel light so as to enhance the directivity of the light.

A power supply connector 57 and a heat sink 150 are disposed sequentially in this order as seen from a rear panel 13 between the light source unit 60 and the right panel 14. In addition, the light source unit 60 includes a heat pipe 130 configured to guide heat generated in the excitation light shining device 70 to the heat sink 150 and a cooling fan 261 configured to cool the heat sink 150. The ultraviolet laser diode 71 is cooled by this cooling fan 261, the heat pipe 130, and the heat sinks 81, 150.

The red light source device 120 and the green light source device 80 are made up of the excitation light shining device 70 and a luminescent plate device 100. As illustrated in FIG. 2, the luminescent plate device 100 includes the luminescent wheel 101, a motor 110, a collective lens group 111, and a collective lens 115. The luminescent wheel 101 is disposed in such a manner as to be substantially parallel to the left panel 15, that is, in such a manner as to intersect an axis of light in the ultraviolet wavelength range emitted from the excitation light shining device 70 and guided by way of a dichroic mirror 141 at right angles. The motor 110 drives and rotates the luminescent wheel 101. The collective lens group 111 collects a pencil of excitation light emitted from the excitation light shining device 70 so as to converge on the luminescent wheel 101 and collects luminescent light emitted from the luminescent wheel 101 in the direction of the left panel 15. The collective lens 115 collects light in the blue wavelength range emitted from the blue light source device 90 in the direction of the luminescent wheel 101.

Here, the luminescent wheel 101 will be described using FIG. 3. The luminescent wheel 101 includes a first surface 101a (a front surface side of the luminescent wheel 101) illustrated in FIG. 3A on to which light in the ultraviolet wavelength range is shined and a second surface 101b (a rear surface side of the luminescent wheel 101) illustrated in FIG. 3B on to which light in the blue wavelength range is shined.

The luminescent wheel 101 has a substantially circular disc-like shape, and a bearing 112 at a central portion is fixed to a shaft portion of the motor 110. The luminescent wheel 101 has a base material 102 formed of metal such as copper, aluminum, or the like. A surface of a side of the base material 102 that constitutes the first surface 101a and on to which light in the ultraviolet wavelength range is shined is mirror finished through silver deposition or the like. A red luminescent light emitting area 310, a green luminescent light emitting area 320, and a transmitting area 330 (a light guiding area) are provided end to end in a circumferential direction near an outer circumferential edge of the luminescent wheel 101. The red luminescent light emitting area 310, the green luminescent light emitting area 320, and the transmitting area 330 are formed continuously via boundaries B1 to B3.

The luminescent light emitting areas 310, 320 are formed on the mirror-finished side of the base material 102 that constitutes the first surface 101a of the luminescent wheel 101. A red luminescent material 311 is formed on the red luminescent light emitting area 310. The red luminescent material 311 emits light in the red wavelength range as luminescent light in every direction when light in the ultraviolet wavelength range emitted from the excitation light shining device 70 is shined on to the red luminescent material 311. Light in the red wavelength range emitted towards the base material 102 is reflected on the surface of the base material 102. Thus, the red luminescent material 311 emits light in the red wavelength range that is luminescently produced towards the dichroic mirror 141.

A green luminescent material 321 is formed on the green luminescent light emitting area 320. The green luminescent material 321 emits light in the green wavelength range as luminescent light in every direction when light in the ultraviolet wavelength range emitted from the excitation light shining device 70 is shined on to the green luminescent material 321. Light in the green wavelength range emitted towards the base material 102 is reflected on the surface of the base material 102. Thus, the green luminescent material 321 also emits light in the green wavelength range that is luminescently produced towards the dichroic mirror 141.

The transmitting area 330 is formed by fitting a transmitting member 331 such as glass having transmissivity in an opening portion formed near an outer circumference of the base material 102 of the luminescent wheel 101. When light in the blue wavelength range emitted from the blue light source device 90 is shined on to the transmitting area 330 from the side constituting the second surface 101b of the luminescent wheel 101, the transmitting area 330 emits the light in the blue wavelength range to the side constituting the first surface 101a of the luminescent wheel 101, that is, the side opposite to the side constituting the second surface 101b. Note that by forming a diffuse layer on the transmitting area 330, the transmitting area 330 can transmit light in the blue wavelength range while diffusing the light. A circumferential length of the transmitting area 330 is shorter than respective circumferential lengths of the red luminescent light emitting area 310 and the green luminescent light emitting area 320.

Figure 3A:
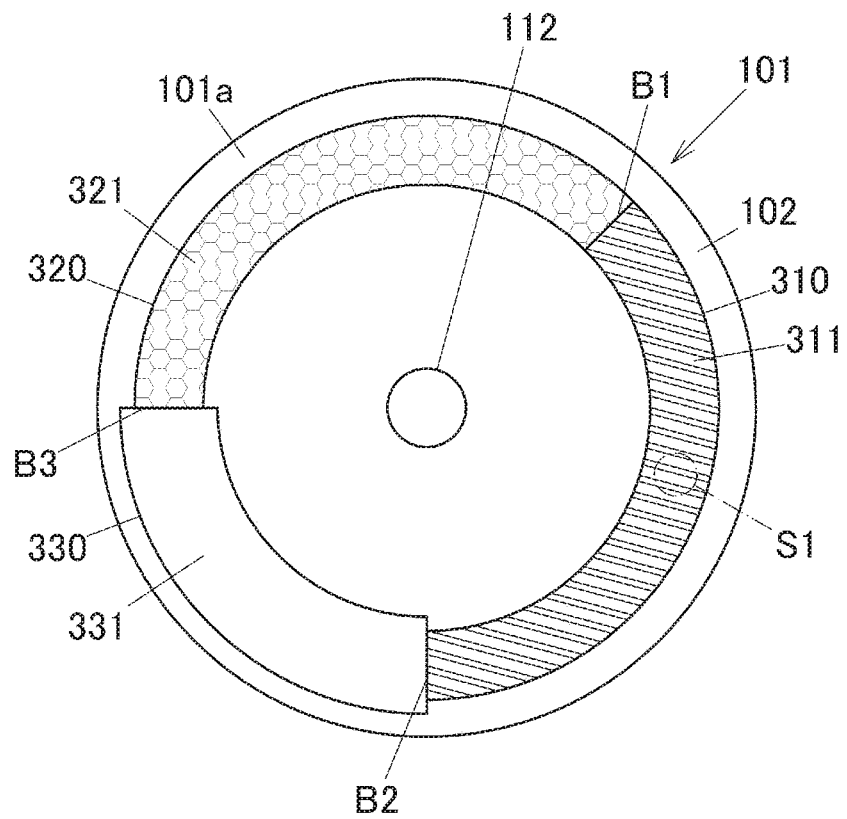
FIG. 3A is a schematic diagram of a luminescent wheel according to the first embodiment of the present invention, illustrating a first surface side.
Figure 3B:
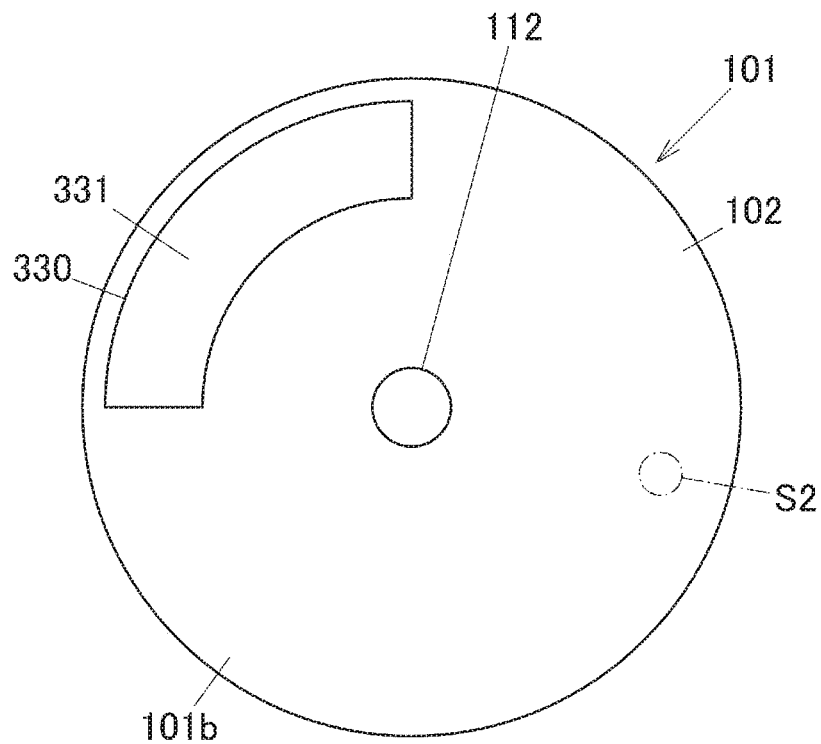
FIG. 3B is a schematic diagram of the luminescent wheel according to the first embodiment of the present invention, illustrating a second surface side.

A shining target area S1 illustrated in FIG. 3A indicates an area where light in the ultraviolet wavelength range is to be shined, and a shining target area S2 illustrated in FIG. 3B indicates an area where light in the blue wavelength range is to be shined. As the luminescent wheel 101 rotates, the shining target area S1 is positioned sequentially on the red luminescent light emitting area 310 and the green luminescent light emitting area 320 with time, and when the shining target area S1 is positioned on the transmitting area 330, the ultraviolet laser diode 71 is turned off. In addition, as the luminescent wheel 101 rotates, the shining target area S2 is positioned sequentially in and out of the light transmitting area 330 with time, and when the shining target area S2 is positioned on the transmitting area 330, a blue laser diode 91 is illuminated.

Returning to FIG. 2, the blue light source device 90 is disposed to the second surface 101b of the luminescent wheel 101. The blue light source device 90 includes the blue laser diode 91 and a collimator lens 73, and the blue laser diode 91 is disposed in such a manner that an optical axis thereof becomes substantially parallel to the front panel 12. Light in the blue wavelength range emitted from the blue laser diode 91 is converted into parallel light by the collimator lens 73. Then, the parallel light is collected by the collective lens 115 and is then guided to the luminescent plate device 100.

The light guiding optical system 140 includes the dichroic mirror 141. The dichroic mirror 141 is disposed between the luminescent plate device 100 and the complex optical system 170 and is disposed to a side of the excitation light shining device 70 that faces the rear panel 13. The dichroic mirror 141 reflects light in the ultraviolet wavelength range and transmits light in the red wavelength range, light in the green wavelength range, and light in the blue wavelength range, whose wavelengths are longer than the wavelength of ultraviolet light. Thus, the dichroic mirror 141 can reflect light in the ultraviolet wavelength range emitted from the excitation light shining device 70 towards the luminescent plate device 100 and can transmit and guide light in the red wavelength range, light in the green wavelength range, and light in the blue wavelength range that are emitted from the luminescent plate device 100 towards the complex optical system 170.

The complex optical system 170 includes a collective lens 173, a light guiding device 175 such as a light tunnel or a glass rod, collective lenses 178, 179, a light shining mirror 185, and a condenser lens 195. The condenser lens 195 emits image light emitted from the display device 50 disposed to a side of the condenser lens 195 that faces the rear panel 13 towards the projection optical system 220, and hence, the condenser lens 195 also constitutes part of the projection optical system 220.

The collective lens 173 is disposed near an incident port of the light guiding device 175 and collects light source light from the light source unit 60. Light beams in the red, green, and blue wavelength ranges are treated by the light guiding device 175 so that their luminance distributions are made uniform. A pencil of light emitted from an emerging port of the light guiding device 175 is collected by the collective lenses 178, 179 and is then guided towards the light shining mirror 185.

The light shining mirror 185 reflects the pencil of light collected by the collective lenses 178, 179 and shines the pencil of light on to the display device 50 at a predetermined angle by way of the condenser lens 195. A heat sink 190 is provided on a side of the display device 50, which is made up of DMD, that faces the rear panel 13, and the display device 50 is cooled by this heat sink 190.

The pencil of light, which is light source light shined onto an image forming surface of the display device 50 by the complex optical system 170, is reflected on the image forming surface of the display device 50 and is then projected on to a screen by way of the projection optical system 220 as projected light. Here, the projection optical system 220 is made up of the condenser lens 190, the movable lens group 235, and a fixed lens group 225. The movable lens group 235 can be moved by the lens motor or manually. The movable lens group 235 and the fixed lens group 225 are incorporated in a fixed lens barrel. Thus, the fixed lens barrel including the movable lens group 235 constitutes a variable-focus lens, whereby a zooming control and a focusing control are enabled.

By configuring the projector 10 in the way described heretofore, when light is emitted at appropriate timings from the excitation light shining device 70 and the blue light source device 90, light in the blue wavelength range, light in the green wavelength range, and light in the red wavelength range are incident on the display device 50 by way of the light guiding optical system 140 and the complex optical system 170. Due to this, the DMD, which constitutes the display device 50 of the projector 10, displays red, green, and blue light beams in accordance with data in a time-sharing manner, whereby a color image can be projected on to the screen.

Figure 4:
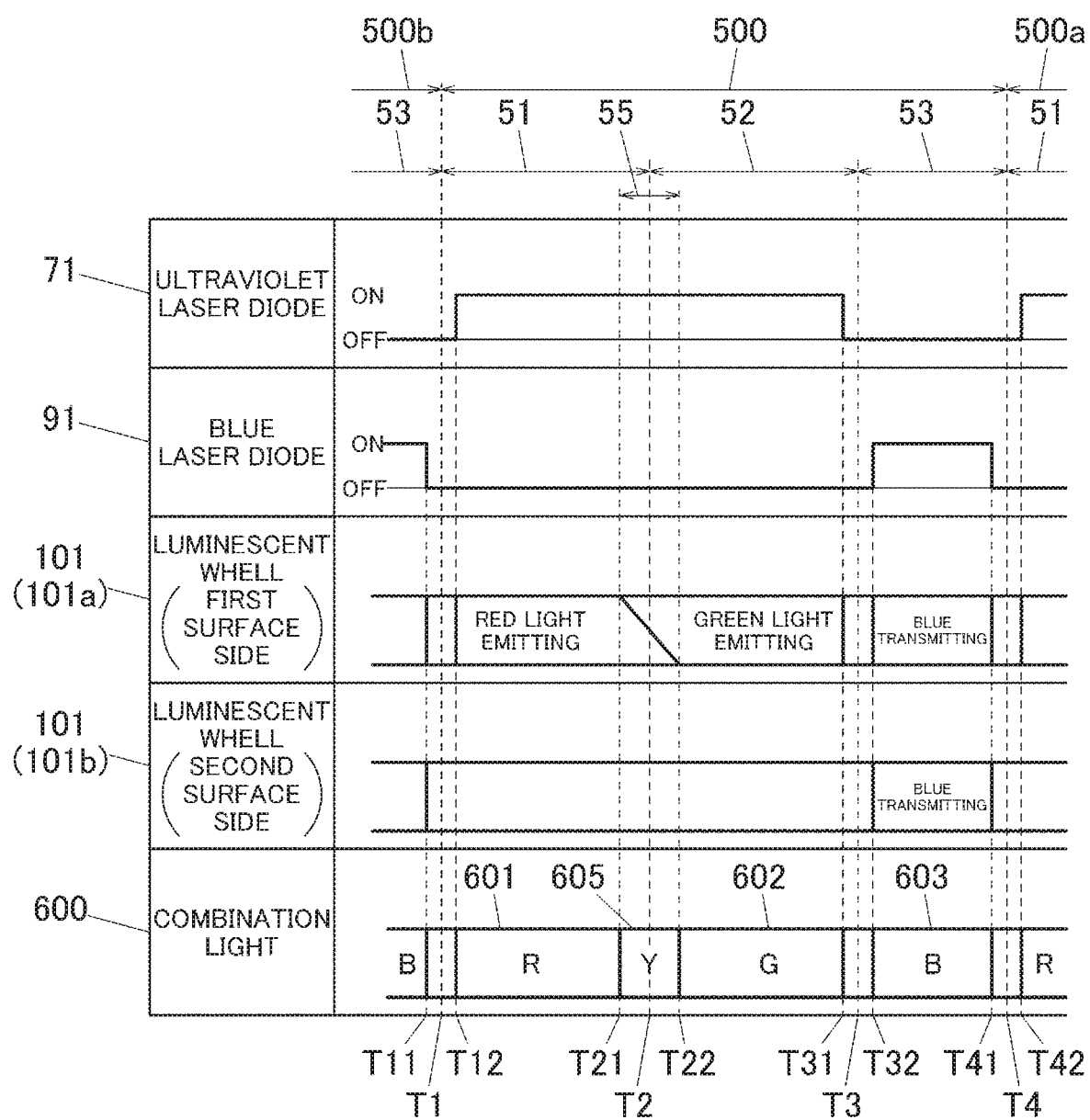
FIG. 4 is a timing chart of a control of a light source according to the first embodiment of the present invention.

Next, a timing chart based on which the light source unit 60 is controlled will be described using FIG. 4. The light source unit 60 emits light beams in the different wavelength ranges in the time-sharing manner within a unit frame 500. The unit frame 500 includes a first period 51 where the luminescent wheel 101 can emit light in the red wavelength range, a second period 52 where the luminescent wheel 101 can emit light in the green wavelength range, and a third period 53 where the luminescent wheel 101 can emit light in the blue wavelength range.

The ultraviolet laser diode 71 emits light in the ultraviolet wavelength range from a timing T12 of the first period 51 to a timing T31 of the second period 52. The ultraviolet laser diode 71 is turned off from the timing T31 to a timing T42 of the next unit frame 500a. Light in the ultraviolet wavelength range emitted from the ultraviolet laser diode 71 is reflected by the dichroic mirror 141 and is then shined on to one or both of the red luminescent light emitting area 310 and the green luminescent light emitting area 320 of the luminescent wheel 101.

The blue laser diode 91 is turned off from a timing T11 to a timing T32 of the unit frame 500. In addition, the blue laser diode 91 emits light in the blue wavelength range from timing T32 to a timing T41.

Since light in the ultraviolet wavelength range is shined on to the red luminescent light emitting area 310 of the luminescent wheel 101 from the timing T12 to a timing T21, the luminescent wheel 101 emits light in the red wavelength range as luminescent light.

From the timing T21 to a timing T22 before and after a timing T2, since the shining target area S1 for light in the ultraviolet wavelength range is positioned near the boundary B1 (refer to FIG. 3) between the red luminescent light emitting area 320 and the green luminescent light emitting area 320, light in the ultraviolet wavelength range is shined on to the red luminescent light emitting area 310 and the green luminescent light emitting area 320. Due to this, the luminescent wheel 101 emits light in the red wavelength range and light in the green wavelength range as luminescent light.

Since light in the ultraviolet wavelength range is shined on to the green luminescent light emitting area 320 from the timing T22 to the timing T31, the luminescent wheel 101 emits light in the green wavelength range as luminescent light.

Since light in the blue wavelength range is shined on to the transmitting area 330 in FIG. 3 from the side constituting the second surface 101b from the timing T32 to the timing T41, the luminescent wheel 101 emits the light in the blue wavelength range that passes through the transmitting area 330 towards the collective lens group 111.

By controlling the light source unit 60 in the way described above, the light source unit 60 emits light 601 in the red wavelength range as combination light 600 from the timing T12 to the timing T21 and emits light having a wavelength in the yellow wavelength range, or simply, light in the yellow wavelength range in which light in the red wavelength range is mixed or combined with light in the green wavelength range as combined light 600 from the timing T21 to the timing T22. The light source unit 60 can emit light 602 in the green wavelength range as combination light 600 from the timing T22 to the timing T31 and emit light 603 in the blue wavelength range as combination light 600 from the timing T32 to the timing T41. The combination light 600 emitted from the light source unit 60 is guided to the complex optical system 170. Since the ultraviolet laser diode 71 and the blue laser diode 91 are turned off during periods from the timing T11 to the timing T12 and from the timing T31 to the timing T32, no light source light is emitted from the light source unit 60.

In addition, the light source unit 60 may causes the ultraviolet laser diode 71 to be turned off during a color mixing period 55 from the timing T21 to the timing T22 so as to prevent the luminescent wheel 101 from emitting light in the yellow wavelength range.

Thus, according to this embodiment, by using light in the ultraviolet wavelength range, whose wavelength is shorter than that of light in the blue wavelength range, as excitation light, even when part of excitation light is reflected on the side of the base material 102 constituting the first surface 101a of the luminescent wheel 101 without exciting the red luminescent material 311 or the green luminescent material 321, the excitation light so reflected is reflected towards the excitation light shining device 70 by the dichroic mirror 141, whereby the excitation light can be prevented from being guided towards the complex optical system 170. Thus, excitation light can be prevented from mixing into light in the green wavelength range and light in the red wavelength range during the periods when the luminescent wheel 101 emits the red light and the green light, whereby the color purity can be improved with good efficiency with the simple configuration.

Second Embodiment

Figure 5:
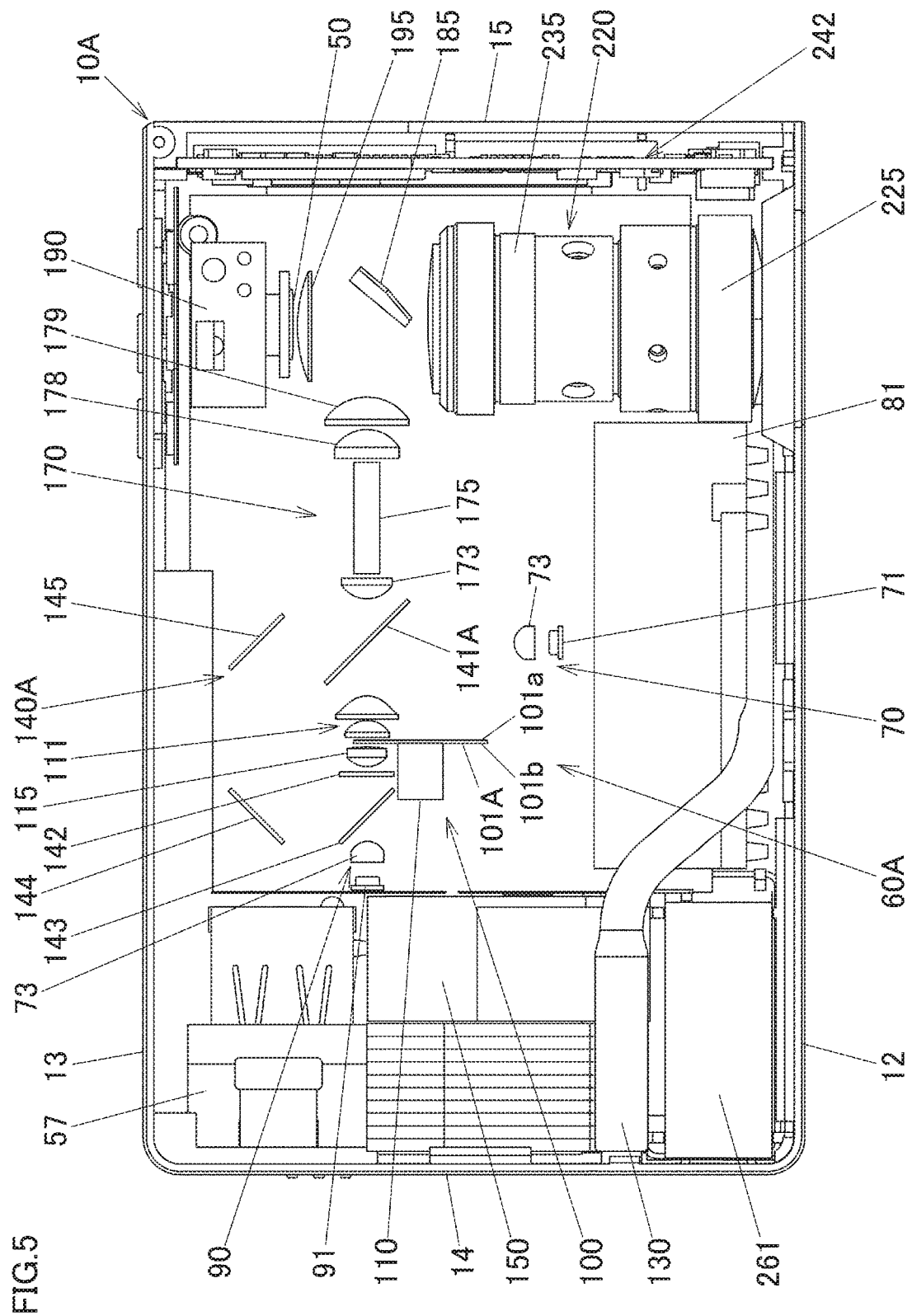
FIG. 5 is a schematic plan view of a projector according to a second embodiment of the present invention, illustrating an internal structure of the projector.

Next, a second embodiment will be described. As illustrated in FIG. 5, a light source unit 60A of this embodiment includes a luminescent wheel 101A configured to emit light in the blue wavelength range in place of the luminescent wheel 101 illustrated in FIG. 2. In addition, the light source unit 60A includes a light guiding optical system 140A configured to guide light in the blue wavelength range reflected by the luminescent wheel 101A towards a complex optical system 170 in place of the light guiding optical system 140 illustrated in FIG. 3. In describing this embodiment, like reference signs will be given to like configurations to those of the first embodiment, and descriptions thereof will be omitted or simplified here.

The luminescent wheel 101A will be described using FIG. 6. The luminescent wheel 101A includes a first surface 101a (a front surface side of the luminescent wheel 101A) illustrated in FIG. 6 on to which light in the ultraviolet wavelength range is shined and a second surface 101b (a rear surface side of the luminescent wheel 101A) illustrated in FIG. 6B on to which light in the blue wavelength range is shined.

The luminescent wheel 101A has a substantially circular disc-like shape. A red luminescent light emitting area 310 and a green luminescent light emitting area 320 are provided end to end in a circumferential direction near an outer circumferential edge of the first surface 101a of the luminescent wheel 101. The red luminescent light emitting area 310 and the green luminescent light emitting area 320 are formed continuously at ends thereof via a boundary B1. An area defined between boundaries B2, B3 at the other ends of the red luminescent light emitting area 310 and the green luminescent light emitting area 320 is made into a non-light emitting area 340 where no luminescent light emitting area is provided. Thus, a luminescent light emitting area including the red luminescent light emitting area 310 and the green luminescent light emitting area 320 is formed into an arc-like shape having a substantially C-shape.

A reflection area 330A (a light guiding area) is formed into an annular shape along a full circumference in a circumferential direction near an outer circumferential edge of the second surface 101b of the luminescent wheel 101A. In a plan view in FIG. 6A, the reflection area 330A is provided in the circumferential direction while overlapping partially the red luminescent light emitting area 310 and the green luminescent light emitting area 320. Consequently, the reflection area 330A includes on the second surface 101b an area that corresponds to the non-light emitting area 340 and the vicinities of the boundaries B1 to B3 on the first surface 101a.

When light in the blue wavelength range emitted by the blue light source device 90 is shined on to the reflection area 330A from a side of the second surface 101b, the reflection area 330A reflects the light in the blue wavelength range so shined.

Figure 6A:
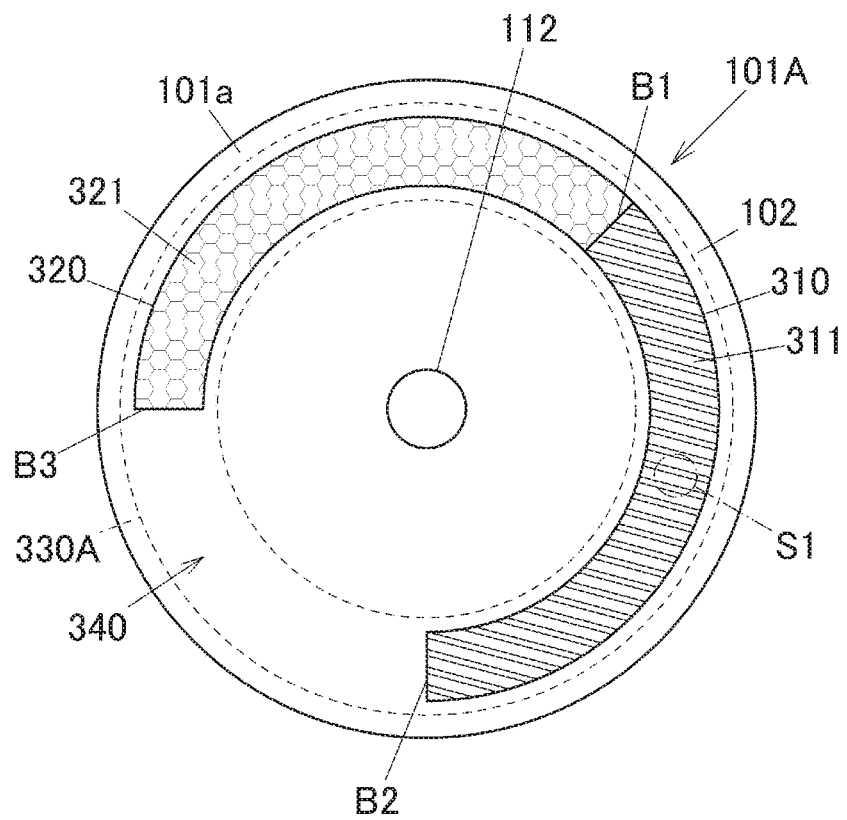
FIG. 6A is a schematic diagram of a luminescent wheel according to the second embodiment of the present invention, illustrating a first surface side.
Figure 6B:
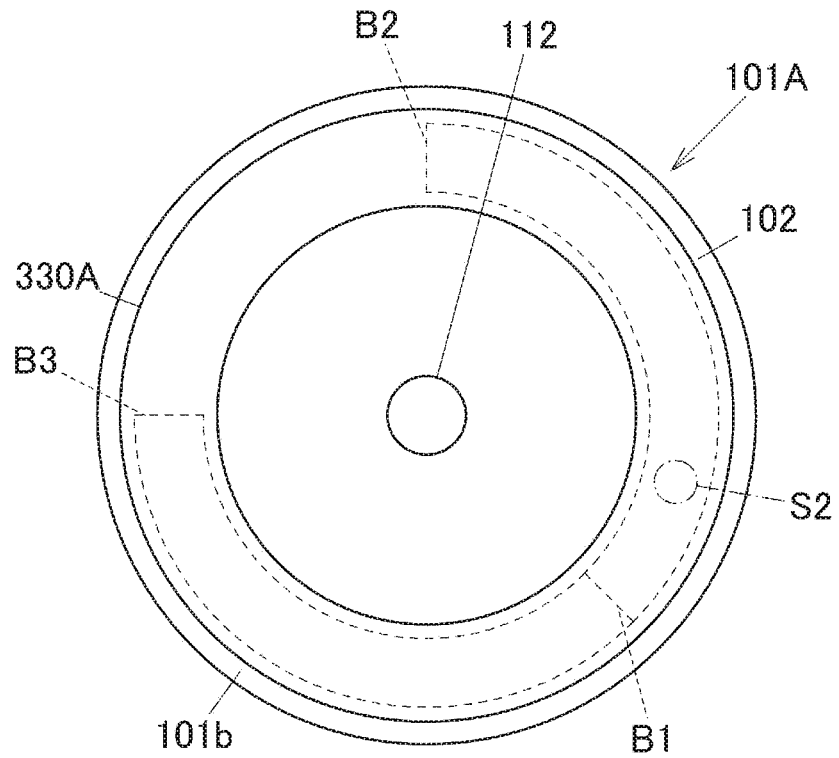
FIG. 6B is a schematic diagram of the luminescent wheel according to the second embodiment of the present invention, illustrating a second surface side.

A shining target area S1 illustrated in FIG. 6A indicates an area where light in the ultraviolet wavelength range is shined, and a shining target area S2 illustrated in FIG. 6B indicates an area where light in the blue wavelength range is shined. As the luminescent wheel 101A rotates, the shining target area S1 is positioned sequentially on the red luminescent light emitting area 310 and the green luminescent light emitting area 320 with time, and when the shining target area S1 is positioned on the non-light emitting area 330A, the ultraviolet laser diode 71 is turned off. In addition, as the luminescent wheel 101A rotates, the shining target area S2 is positioned sequentially in different positions within the reflection area 330A with time, and when the shining target area S2 is positioned at a portion on the reflection area 330A that corresponds to the non-light emitting area 340 and the vicinities of the boundaries B1 to B3 on the first surface 101a, the blue laser diode 91 is illuminated.

Returning to FIG. 5, the blue light source device 90 is disposed to the second surface 101b of the luminescent wheel 101A. Light in the blue wavelength range emitted from a blue laser diode 91 of the blue light source device 90 is converted into parallel light by the collimator lens 73 and is then guided towards the luminescent plate device 100.

The light guiding optical system 140A includes a dichroic mirror 141A, a quarter wave plate 142, a polarization beam splitter 143, a first reflection mirror 144, and a second reflection mirror 145. The dichroic mirror 141A is disposed between the luminescent plate device 100 and the complex optical system 170 and is disposed to a side of an excitation light shining device 70 that faces a rear panel 13. The dichroic mirror 141A reflects light in the blue wavelength range and light in the ultraviolet wavelength range and transmits light in the red wavelength range and light in the green wavelength range, whose wavelengths are longer than that of light in the blue wavelength range.

The quarter wave plate 142 is disposed between the luminescent wheel 101A and the blue laser diode 91. The quarter wave plate 142 shifts 90 degrees the phase of incident light to change a polarization direction. Linearly polarized light in the blue wavelength range emitted from the blue laser diode 91 is transmitted through the quarter wave plate to be converted into circularly polarized light and is then reflected on the reflection area 330A on the luminescent wheel 101A. The light in the blue wavelength range so reflected passes through the quarter wave plate 142 again to be converted from the circularly polarized light into linearly polarized light and is then guided to the polarization beam splitter 143. The polarization of the light in the blue wavelength range that has passed double through the quarter wave plate 142 is shifted 90 degrees relative to the initial polarization direction resulting immediately after it is initially emitted from the blue laser diode 91.

The polarization beam splitter 143 is disposed between the quarter wave plate 142 and the blue laser diode 91 and functions as a polarization dichroic mirror for light in the blue wavelength range. The polarization beam splitter 143 transmits light in the blue wavelength range in a first polarization direction (for example, p-polarized light) emitted from the blue laser diode 91 towards the quarter wave plate 142 and reflects light in the blue wavelength range in a second polarization direction (for example, s-polarized light) emitted from the quarter wave plate 142 towards the first reflection mirror 144, the second polarization direction being different 90 degrees from the first polarization direction.

The first reflection mirror 144 reflects the light in the blue wavelength range that is reflected by the polarization beam splitter 143 towards the second reflection mirror 145.

The second reflection mirror 145 reflects the light in the blue wavelength range reflected by the first reflection mirror 144. Thereafter, the light in the blue wavelength range reflected by the second reflection mirror 145 is reflected and is guided towards the complex optical system 170 by the dichroic mirror 141A.

In this way, the dichroic mirror 141A reflects light in the ultraviolet wavelength range emitted from the excitation light shining device 70 towards the luminescent plate device 100, while transmitting to guide light in the red wavelength range and light in the green wavelength range emitted from the luminescent plate device 100 towards the complex optical system 170. Additionally, the dichroic mirror 141A reflects to guide light in the blue wavelength range emitted from the polarization beam splitter 143 towards the complex optical system 170.

Next, a timing chart based on which the light source unit 60A is controlled will be described using FIG. 7. The light source unit 60A emits light beams in the different wavelength ranges in a time-sharing manner within a unit frame 500. The unit frame 500 includes a first period 51 where the luminescent wheel 101A can emit light in the red wavelength range, a second period 52 where the luminescent wheel 101A can emit light in the green wavelength range, and a third period 53 where the luminescent wheel 101A can emit light in the blue wavelength range.

The ultraviolet laser diode 71 emits light in the ultraviolet wavelength range from a timing T1 to a timing T3 including the first period 51 and the second period 52. Light in the ultraviolet wavelength range emitted from the ultraviolet laser diode 71 is reflected by the dichroic mirror 141A and is then shined on one or both of the red luminescent light emitting area 310 and the green luminescent light emitting area 320. Additionally, the ultraviolet laser diode 71 is turned off from the timing T3 including the third period 53 to a timing T4 at which the next unit frame 500a is initiated.

The blue laser diode 91 emits light in the blue wavelength range from a timing T31 to a timing T42 (or from the timing T1 to a timing T12, and from the timing T31 to the timing T4) including portions of the first period 51 and the second period 52, and the third period 53. The blue laser diode 91 is turned off from the timing T12 constituting part of the first period 51 to the timing T31 constituting part of the second period.

Light in the blue wavelength range that is shined on to the reflection area 330A from the timing T31 to the timing T42 is reflected towards the quarter wave plate 142 and is then reflected by the polarization beam splitter 143 and the two reflection mirrors 144, 145 to be guided to the dichroic mirror 141A. Thereafter, the light in the blue wavelength range is reflected by the dichroic mirror 141A to be emitted to the complex optical system 170.

Light in the ultraviolet wavelength range is shined on to the red luminescent light emitting area 310 of the luminescent wheel 101A from the timing T1 to a timing T21, and the luminescent wheel 101A emits light in the red wavelength range as luminescent light. In this period, from the timing T1 to the timing T12, light in the blue wavelength range is shined on to the reflection area 330A, and the luminescent wheel 101A also emits light in the blue wavelength range via the light guiding optical system 140A.

Since the shining target area S1 of light in the ultraviolet wavelength range is positioned in the vicinity of the boundary B1 between the red light luminescent light emitting area 310 and the green light emitting area 320 from the timing T21 to the timing T22 before and after the timing T2, light in the ultraviolet wavelength range is shined on the red luminescent light emitting area 310 and the green luminescent light emitting area 320. Due to this, the luminescent wheel 101A emits light in the red wavelength range and light in the green wavelength range as luminescent light.

Since light in the ultraviolet wavelength range is shined on to the green luminescent light emitting area 320 from the timing T22 to the timing T3, the luminescent wheel 101A emits light in the green wavelength range as luminescent light. Within this period, from the time T31 to the timing T3, light in the blue wavelength range is shined on to the reflection area 330A, whereby the luminescent wheel 101A also emit light in the blue wavelength range via the light guiding optical system 140A.

By controlling the light source unit 60A in the way described heretofore, the light source unit 60A can emit light 601 in the red wavelength range as combination light 600 from the timing T12 to the timing T21. The light source unit 60A can emit light 602 in the green wavelength rage as combination light 600 from the timing T22 to the timing T31. The light source unit 60A can emit light 603 in the blue wavelength range from the timing T3 to the timing T4 as combination light 600.

In addition, in color mixing periods 54, 55, 56, the light source unit 60A can emit light 604 in the magenta wavelength range resulting from mixing light in the red wavelength range with light in the blue wavelength range as combination light 600 from the timing T1 to the timing T12 (or from the timing T4 to the timing T42). The light source unit 60A can emit light 605 in the yellow wavelength range resulting from mixing light in the red wavelength range with light in the green wavelength range as combination light from the timing T21 to the timing T22. The light source unit 60A can emit light 606 in the cyan wavelength range resulting from mixing light in the green wavelength range with light in the blue wavelength range as combination light 600 from the timing T31 to the timing T3. The combination light 600 emitted from the light source unit 60A is guided to the complex optical system 170.

The light source unit 60A can emit light 601 in the red wavelength range as combination light 600 from the timing T1 to the timing T12 only by illuminating the ultraviolet laser diode 71 and turning off the blue laser diode 91. In addition, the light source unit 60A can emit light 602 in the green wavelength range as combination light 600 from the timing T31 to the timing T3 only by illuminating the ultraviolet laser diode 71 and turning off the blue laser diode 91. Thus, the light source unit 60A can extends the periods where light in 601 in the red wavelength range and light 602 in the green wavelength range are mitted longer.

Figure 7:
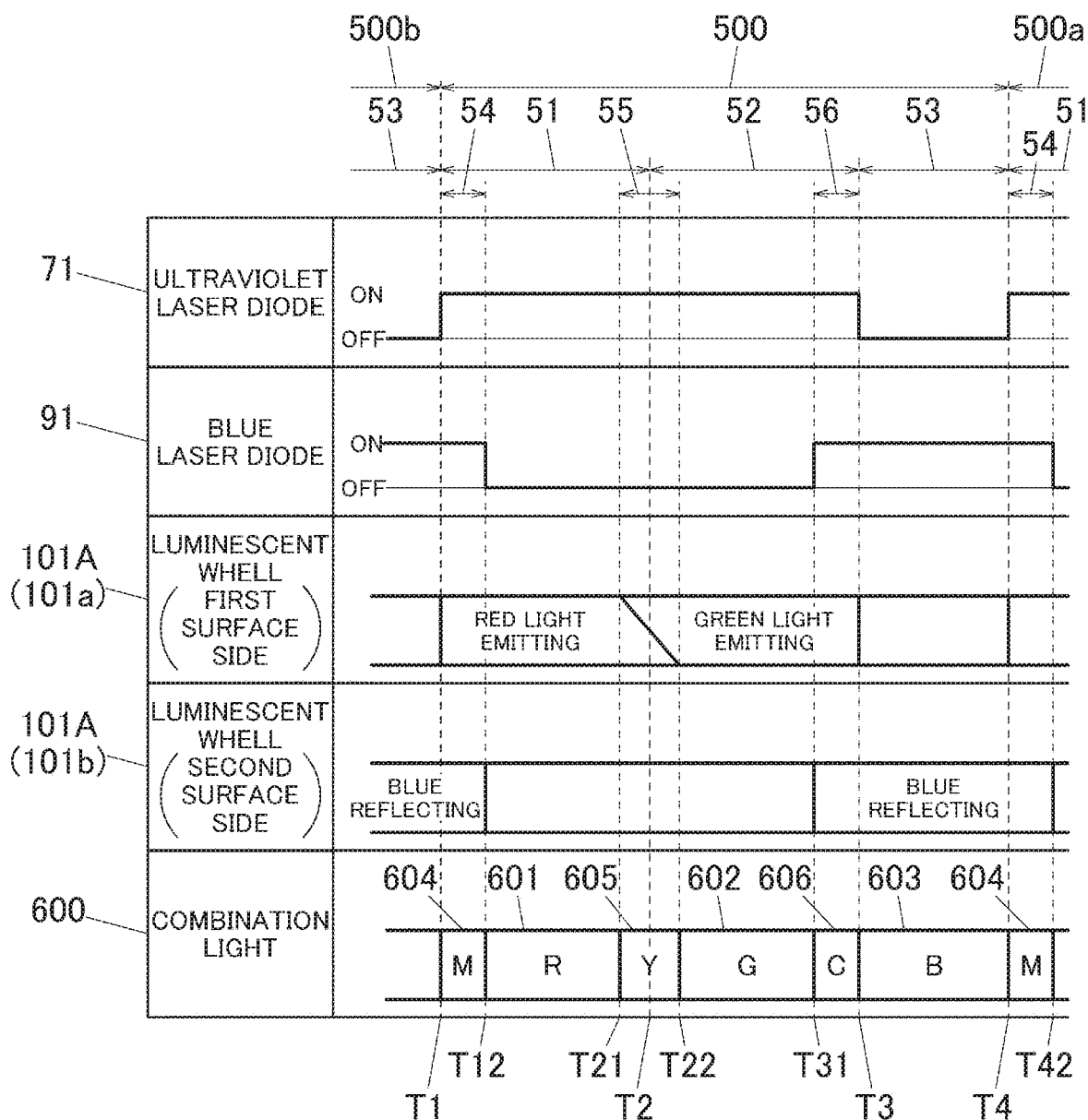
FIG. 7 is a timing chart of a control of a light source according to the second embodiment of the present invention.

In addition, the luminescent wheel 101A can cause light in the blue wavelength range to be emitted from the blue laser diode 91 during the color mixing period 55 illustrated in FIG. 7, whereby white light can be emitted as combination light 600 during the color mixing period 55.

Modified Examples of Second Embodiment

Next, modified examples made to the luminescent wheel 101A of the second embodiment will be described by reference to FIG. 8. FIG. 8A is a schematic diagram illustrating a first surface 101*a* (a front surface side) of a luminescent wheel 101A1 according to a first modified example, and FIG. 8B is a schematic diagram illustrating a first surface 101*a* (a front surface side) of a luminescent wheel 101A2 according to a second modified example. In the first and second modified examples, the luminescent wheels 101A1, 101A2 are used in place of the luminescent wheel 101A of the luminescent plate device 100 illustrated in FIG. 5, and configurations of reflection areas on second surfaces 101*b* differ from that of the luminescent wheel 101A.

The luminescent wheel 101A1 illustrated in FIG. 8A includes an arc-like reflection area 330A1 and an arc-like reflection area 330A2 (a light guiding area) on the second surface 101*b*. The reflection area 330A1 is formed longer in a circumferential direction than the reflection area 330A2. The reflection areas 330A1, 330A2 are formed intermittently on the second surface 101*b* in such a manner as to correspond to a non-light emitting area 340 and in the vicinities of boundaries B1 to B3 on the first surface 101*a*. Thus, the reflection areas 330A1, 330A2 are provided in the circumferential direction on the second surface 101*b* while overlapping partially the red luminescent light emitting area 310 and the green luminescent light emitting area 320 on the first surface 101*a* in a plan view.

Since the luminescent wheel 101A1 includes the reflection areas 330A1, 330A2 that are provided intermittently on the second surface 101*b*, a total reflection area on the luminescent wheel 101A1 is made smaller and hence more simplified in configuration than the reflection area of the luminescent wheel 101A, while such mixed colors of light as light in the cyan wavelength range, light in the yellow wavelength range, light in the magenta wavelength range, and white light can be emitted arbitrarily.

The luminescent wheel 101A2 illustrated in FIG. 8B has an arc-like reflection area 330A1 (a light guiding area) on the second surface 101*b* as with the reflection area 330A1 of the first modified example illustrated in FIG. 8A. The reflection area 330A1 is formed on an area on the second surface 101*b* that correspond to a non-light emitting area 340 and the vicinities of boundaries B2, B3 on the first surface 101*a*. Being different from the luminescent wheel 101A1, the luminescent wheel 101A2 includes no reflection area (the reflection area 330A2 illustrated in FIG. 8A) in a position corresponding to a boundary B1. Consequently, the reflection area 330A1 is provided in the circumferential direction on the second surface 101*b* while partially overlapping the red luminescent light emitting area 310 and the green luminescent light emitting area 320 in the plan view.

Since the luminescent wheel 101A2 includes the reflection area 330A1 on the second surface 101*b*, in the luminescent wheel 101A2, the configuration of the reflection area can be simplified more than that of the reflection area of the luminescent wheel 101A1 while enabling the mixed colors of light such as light in the cyan wavelength range, light in the yellow wavelength range, and light in the magenta wavelength range to be emitted arbitrarily.

Thus, as has been described heretofore, the light source unit 60A includes the ultraviolet laser diode 71 configured to emit light in the ultraviolet wavelength range whose wavelength differs from that of light in the blue wavelength range as the excitation light source and the dichroic mirror 141A configured to reflect light in the ultraviolet wavelength range. This configuration can prevent light in the blue wavelength range from mixing into light in the red wavelength range and light in the green wavelength range that are emitted as combination light 600 with no intention. Additionally, mixed colors of light can be emitted arbitrarily during the color mixing periods 54 to 56 by controlling the timings at which the ultraviolet laser diode 71 and the blue laser diode 91 are illuminated.

Although the ultraviolet laser diode 71 is described as emitting light in the ultraviolet wavelength range as excitation light in the embodiments, the present invention is not limited to this configuration. Hence, a blue laser diode configured to emit light of the same chromatic band as that of the light in the blue wavelength range emitted by the blue laser diode 91 may be used in place of the ultraviolet laser diode 71, provided the wavelength of the light emitted by the blue laser diode replacing the ultraviolet laser diode 71 is shorter than the wavelength of the light in the blue wavelength range emitted by the blue laser diode 91. In this way, even though the light in the blue wavelength range having the shorter wavelength than that of the light in the blue wavelength range emitted by the blue laser diode 91 is used as excitation light, the excitation light can be prevented from being guided to the complex optical system 170 by the dichroic mirrors 141, 141A.

Thus, the light source units 60, 60A of the embodiments are described as including the blue light source, the excitation light source, and the corresponding luminescent wheel 101, 101A, 101A1, 101A2, and the excitation light is described as being shined on to the luminescent light emitting area from the side of the first surface 101*a*, while the light in the blue wavelength range is described as being shined on to the light guiding area from the side of the second surface 101*b* which is opposite to the side of the first surface 101*a*. With the light source units 60, 60A and the projector 10, since the excitation light is made up of the light in the ultraviolet wavelength range whose wavelength is shorter than the wavelength of the light in the blue wavelength range, the optical path of the excitation light can be controlled easily by separating it from the optical path of the luminescent light, thereby making it possible to reduce a risk of the colors of the excitation light and the luminescent light mixing together. Consequently, the necessity of controlling the wavelength components of the luminescent wheel by a color wheel or the like can be obviated, whereby the color purity can be improved with good efficiency with the small and simplified configuration.

In addition, the light source units 60, 60A include corresponding dichroic mirrors 141, 141A configured to guide the excitation light emitted from the excitation light source to the luminescent wheels 101, 101A and also configured to guide luminescent light emitted from the luminescent wheels 101, 101A, 101A1, 101A2 to the light guiding device 175. With the light source units 60, 60A configured in this way, the luminescent light and the light in the blue wavelength range that are used as light source light can easily be separated from the excitation light, whereby the risk of the color of the excitation light mixing into the colors of the light source light can be reduced.

In addition, the light guiding area is the transmitting area 330 that transmits light in the blue wavelength range, and the dichroic mirror 141 reflects excitation light emitted from the excitation light source towards the luminescent wheel 101 and transmits luminescent light emitted from the luminescent light emitting area and the light in the blue wavelength range that has passed through the transmitting area 330 to the light guiding device 175. Since the direction of the luminescent light emitted from the luminescent wheel 101 is substantially the same as the direction of the light in the blue wavelength range, light used as light source light can be guided to the complex optical system 170 with a small number of optical members.

The luminescent light emitting area includes the red luminescent light emitting area 310 configured to emit light in the red wavelength range as luminescent light and the green luminescent light emitting area 320 configured to emit light in the green wavelength range as luminescent light, and the red luminescent light emitting area 310, the green luminescent light emitting area 320, and the transmitting area 330 are provided end to end in the circumferential direction on the luminescent wheel 101. Due to this, excitation light can be shined simultaneously on to the red luminescent light emitting area 310 and the green luminescent light emitting area 320, so that light in the yellow wavelength range can be emitted from the luminescent wheel 101 as light source light.

The light source unit 60A includes the quarter wave plate 142 disposed between the blue light source and the luminescent wheel 101A, 101A1, 101A2 and the polarization beam splitter 143 disposed between the blue light source and the quarter wave plate 142, and this polarization beam splitter 143 transmits light in the blue wavelength ranged emitted from the blue light source and reflects light in the blue wavelength range whose polarization direction is shifted 90 degrees by the quarter wave plate 142. Then, the light guiding area is the reflection area 330A, 330A1, 330A2 formed on the second surface 101b to reflect light in the blue wavelength range, and the dichroic mirror 141A reflects excitation light emitted from the excitation light source towards the luminescent wheel 101A, 101A1, 101A2 and reflects the light in the blue wavelength range that is reflected by the polarization beam splitter 143 to the light guiding device 175. Due to this, the light in the blue wavelength range reflected by the luminescent wheel 101A, 101A1, 101A2 is caused to be emitted at the timings at which luminescent light is emitted, and resulting mixed colors of light can be emitted arbitrarily as light source light of the light source unit 60A.

The luminescent light emitting area includes the red luminescent light emitting area 310 configured to emit light in the red wavelength range as luminescent light and the green luminescent light emitting area 320 configured to emit light in the green wavelength range as luminescent light. The red luminescent light emitting area 310 and the green luminescent light emitting area 320 are provided end to end in the circumferential direction on the first surface 101a of the luminescent wheel 101A, and the reflection area 330A is provided in the circumferential direction on the second surface 101b while partially overlapping the red luminescent light emitting area 310 and the green luminescent light emitting area 320 in the plan view. Due to this, the excitation light can be shined simultaneously on to the red luminescent light emitting area 310 and the green luminescent light emitting area 320, or the light in the blue wavelength range can be emitted simultaneously while the excitation light is shined on to the red luminescent light emitting area 310 and the green luminescent light emitting area 320, whereby mixed colors of light can be emitted arbitrarily as light source light of the light source unit 60A.

The excitation light source is disposed on the first surface 101a of the luminescent wheel 101, 101A, and the blue light source is disposed on the second surface 101b of the luminescent wheel, whereby the configurations of the light source units 60, 60A can be simplified.

With the light source units 60, 60A using light in the ultraviolet wavelength range as excitation light, since the optical paths of the excitation light and light in the blue wavelength range can easily be separated by a wavelength filter, and the light that cannot be visually perceived is used as the excitation light, a reduction in color purity of resulting luminescent light can be prevented.

In the embodiments that have been described above, the red luminescent light emitting area 310 and the green luminescent light emitting area 320 are described as being disposed end to end in the circumferential direction on the first surface 101a of the luminescent wheels 101, 101A as the luminescent light emitting area, but the present invention is not limited to this configuration.

For example, only a yellow luminescent light emitting area may be disposed as the luminescent light emitting area. In this case, a color wheel is disposed ahead of an incident surface of the light guiding device 175. A blue transmitting area configured to transmit light in the blue wavelength range, a green selection filter configured to transmit only light in the green wavelength range in order to extract light in the green wavelength range from light in the yellow wavelength range, and a red selection filter configured to transmit only light in the red wavelength range in order to extract light in the red wavelength range from light in the yellow wavelength range are disposed in the circumferential direction on the color wheel. The color wheel rotates in synchronism with the luminescent wheels 101, 101A.

Alternatively, a green luminescent light emitting area and a yellow luminescent light emitting area may be disposed as the luminescent light emitting area. In this case, too, a color wheel is disposed ahead of the incident surface of the light guiding device 175. A blue transmitting area configured to transmit light in the blue wavelength range, a green transmitting area configured to transmit light in the green wavelength range, and a red selection filter configured to transmit only light in the red wavelength range in order to extract light in the red wavelength range from light in the yellow wavelength range are disposed in the circumferential direction on the color wheel. The color wheel rotates in synchronism with the wheels 101, 101A.

While the embodiments and modified examples of the present invention have been described heretofore, the embodiments and the modified examples are presented as examples, and hence, there is no intention to limit the scope of the present invention by these embodiments and modified examples. These novel embodiments can be carried out in other various forms, and various omissions, replacements and modifications can be made to the embodiments without departing from the spirit and scope of the present invention. Those resulting embodiments and their modifications are included in the spirit and scope of the present invention and are also included in the scope of inventions claimed for patent under claims below and their equivalents.

What is claimed is:

1. A light source unit comprising:
a blue light source configured to output light in a blue wavelength range;
an excitation light source configured to emit excitation light having a shorter wavelength than a wavelength of the light in the blue wavelength range outputted from the blue light source; and
a luminescent wheel comprising a luminescent light emitting area on to which the excitation light is shined to thereby emit luminescent light and a light guiding area configured to transmit or reflect the light in the blue wavelength range, wherein the excitation light is shined on to the luminescent light emitting area from a first surface side of the luminescent wheel, and wherein the light in the blue wavelength range is shined on to the light guiding area from a second surface side of the luminescent wheel that is opposite to the first surface side.

2. The light source unit according to claim 1, comprising:
a dichroic mirror configured to guide the excitation light emitted from the excitation light source to the luminescent wheel and configured to guide the luminescent light emitted from the luminescent wheel and the light in the blue wavelength range to a light guiding device.

3. The light source unit according to claim 2,
wherein the light guiding area is a transmission area configured to transmit the light in the blue wavelength range.

4. The light source unit according to claim 3,
wherein the dichroic mirror reflects the excitation light emitted from the excitation light source to the luminescent wheel and transmits the luminescent light emitted from the luminescent light emitting area and the light in the blue wavelength range that has passed through the transmitting area to the light guiding device.

5. The light source unit according to claim 4,
wherein the luminescent light emitting area comprises a red luminescent light emitting area configured to emit light in a red wavelength range as the luminescent light and a green luminescent light emitting area configured to emit light in a green wavelength range as the luminescent light.

6. The light source unit according to claim 5,
wherein the red luminescent light emitting area, the green luminescent light emitting area, and the transmitting area are provided end to end in a circumferential direction on the luminescent wheel.

7. The light source unit according to claim 3,
wherein the excitation light source is disposed on the first surface side of the luminescent wheel, and
wherein the blue light source is disposed on the second surface side of the luminescent wheel.

8. The light source unit according to claim 3,
wherein the excitation light is light in an ultraviolet wavelength range.

9. The light source unit according to claim 4,
wherein the excitation light source is disposed on the first surface side of the luminescent wheel, and
wherein the blue light source is disposed on the second surface side of the luminescent wheel.

10. The light source unit according to claim 4,
wherein the excitation light is light in an ultraviolet wavelength range.

11. The light source unit according to claim 2, comprising:
a quarter wave plate disposed between the blue light source and the luminescent wheel; and
a polarization beam splitter disposed between the blue light source and the quarter wave plate and configured to transmit the light in the blue wavelength range and reflect the light in the blue wavelength range whose polarization direction is shifted 90 degrees by the quarter wave plate.

12. The light source unit according to claim 11,
wherein the light guiding area is a reflection area formed on the second surface and configured to reflect the light in the blue wavelength range, and
wherein the dichroic mirror reflects the excitation light emitted from the excitation light source to the luminescent wheel and reflect the light in the blue wavelength range reflected by the polarization beam splitter to the light guiding device.

13. The light source unit according to claim 12,
Wherein the luminescent light emitting area comprises a red luminescent light emitting area configured to emit light in the red wavelength range as the luminescent light and a green luminescent light emitting area configured to emit light in the green wavelength range as the luminescent light.

14. The light source unit according to claim 13,
wherein the red luminescent light emitting area and the green luminescent light emitting area are provided end to end in a circumferential direction on the first surface side of the luminescent wheel.

15. The light source unit according to claim 14,
wherein the reflection area is provided in a circumferential direction on the second surface side while partially overlapping the red luminescent light emitting area and the green luminescent light emitting area in a plan view.

16. The light source unit according to claim 2,
wherein the excitation light source is disposed on the first surface side of the luminescent wheel, and
wherein the blue light source is disposed on the second surface side of the luminescent wheel.

17. The light source unit according to claim 2,
wherein the excitation light is light in an ultraviolet wavelength range.

18. The light source unit according to claim 1,
wherein the excitation light source is disposed on the first surface side of the luminescent wheel, and
wherein the blue light source is disposed on the second surface side of the luminescent wheel.

19. The light source unit according to claim 1,
wherein the excitation light is light in an ultraviolet wavelength range.

20. A projector comprising:
the light source according to claim 1;
a display device on to which light source light from the light source unit is shined to form image light;
a projection optical system configured to project the image light emitted from the display device on to a screen; and
a control unit configured to control the display device and the light source unit.

* * * * *